United States Patent
Kezobo et al.

(10) Patent No.: US 9,876,458 B2
(45) Date of Patent: Jan. 23, 2018

(54) CONTROL DEVICE FOR AC ROTATING MACHINE AND ELECTRIC POWER STEERING DEVICE

(71) Applicant: Mitsubishi Electric Corporation, Tokyo (JP)

(72) Inventors: Isao Kezobo, Tokyo (JP); Tatsuya Mori, Tokyo (JP); Yoshihiko Kimpara, Tokyo (JP); Shunsuke Nakajima, Tokyo (JP); Akira Furukawa, Tokyo (JP)

(73) Assignee: Mitsubishi Electric Corporation, Chiyoda-ku, Tokyo (JP)

( * ) Notice: Subject to any disclaimer, the term of this patent is extended or adjusted under 35 U.S.C. 154(b) by 0 days.

(21) Appl. No.: 15/107,217

(22) PCT Filed: Mar. 19, 2014

(86) PCT No.: PCT/JP2014/057546
§ 371 (c)(1),
(2) Date: Jun. 22, 2016

(87) PCT Pub. No.: WO2015/140960
PCT Pub. Date: Sep. 24, 2015

(65) Prior Publication Data
US 2017/0033724 A1 Feb. 2, 2017

(51) Int. Cl.
*H02P 6/10* (2006.01)
*H02P 29/024* (2016.01)
*H02P 6/14* (2016.01)

(52) U.S. Cl.
CPC .............. *H02P 29/024* (2013.01); *H02P 6/14* (2013.01); *H02P 29/0241* (2016.02)

(58) Field of Classification Search
CPC ................................. H02P 29/024; H02P 6/14
See application file for complete search history.

(56) References Cited

U.S. PATENT DOCUMENTS 5,357,181 A * 10/1994 Mutoh ................ B60L 3/0038
  318/139
7,459,879 B2 * 12/2008 Kezobo ................ B62D 5/046
  318/727

(Continued)

FOREIGN PATENT DOCUMENTS

JP   2009-035155 A   2/2009
JP   2011-078230 A   4/2011

(Continued)

OTHER PUBLICATIONS

Communication dated Sep. 13, 2016 from the Japanese Patent Office in counterpart application No. 2016-508396.

(Continued)

*Primary Examiner* — Shawki S Ismail
*Assistant Examiner* — Muhammad S Islam
(74) *Attorney, Agent, or Firm* — Sughrue Mion, PLLC; Richard C. Turner

(57) ABSTRACT

A control device for an AC rotating machine includes an electric-power converter that has two or more switching devices connected with an AC rotating machine and applies a voltage to the AC rotating machine, a switch that opens or closes an electric connection path between the AC rotating machine and the electric-power converter, a switching device controller that controls opening and closing of the switching devices, and a switch controller that controls opening and closing of the switch; when a failure occurs in the electric-power converter, the AC rotating machine, or the electric connection path therebetween, the switch controller controls opening and closing of the switch in accordance with rotation information on the AC rotating machine.

19 Claims, 12 Drawing Sheets

|  |  | FAILURE PHASE | | |
|---|---|---|---|---|
|  |  | U | V | W |
| MODE | I | ALL ON | ← | ← |
|  | II | UR OFF OTHERS ON | VR OFF OTHERS ON | WR OFF OTHERS ON |
|  | III | ALL OFF | ← | ← |

(56) References Cited

U.S. PATENT DOCUMENTS

| | | | |
|---|---|---|---|
| 2008/0094762 A1* | 4/2008 | Ochiai | H02P 29/032 361/24 |
| 2009/0021207 A1* | 1/2009 | Kezobo | B62D 5/0484 318/798 |
| 2009/0066286 A1* | 3/2009 | Gunji | B62D 5/0487 318/490 |
| 2010/0060222 A1 | 3/2010 | Kezobo et al. | |
| 2011/0074333 A1 | 3/2011 | Suzuki | |
| 2012/0086372 A1* | 4/2012 | Henke | B62D 5/046 318/400.12 |
| 2014/0077736 A1 | 3/2014 | Donner et al. | |

FOREIGN PATENT DOCUMENTS

| | | |
|---|---|---|
| JP | 4772116 B2 | 9/2011 |
| WO | 2008/129658 A1 | 3/1916 |
| WO | 2012/160092 A2 | 11/2012 |

OTHER PUBLICATIONS

International Search Report of PCT/JP2014/057546 dated Jun. 10, 2014 [PCT/ISA/210].

Communication dated Mar. 21, 2017, issued from the Japanese Patent Office in counterpart Application No. 2016-508396.

* cited by examiner

FIG. 6
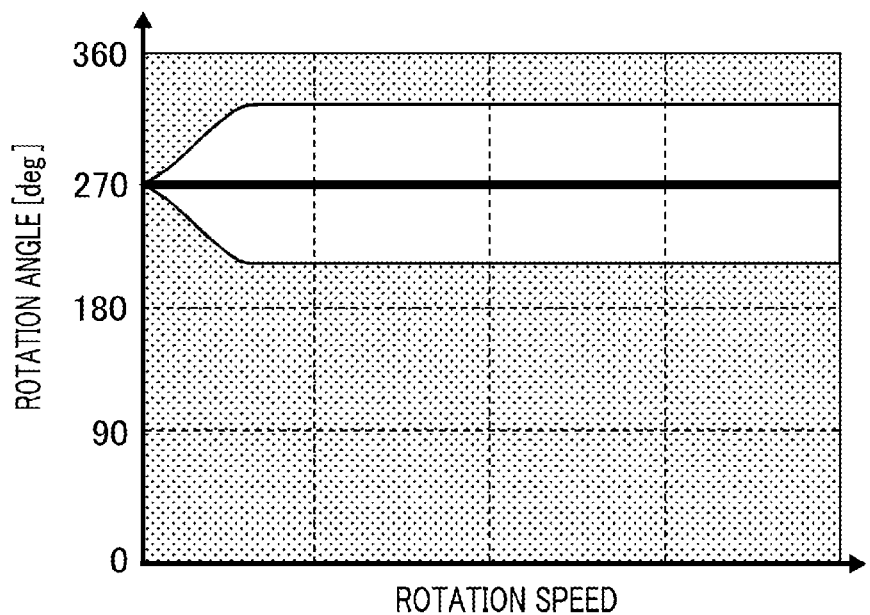
FIG. 7
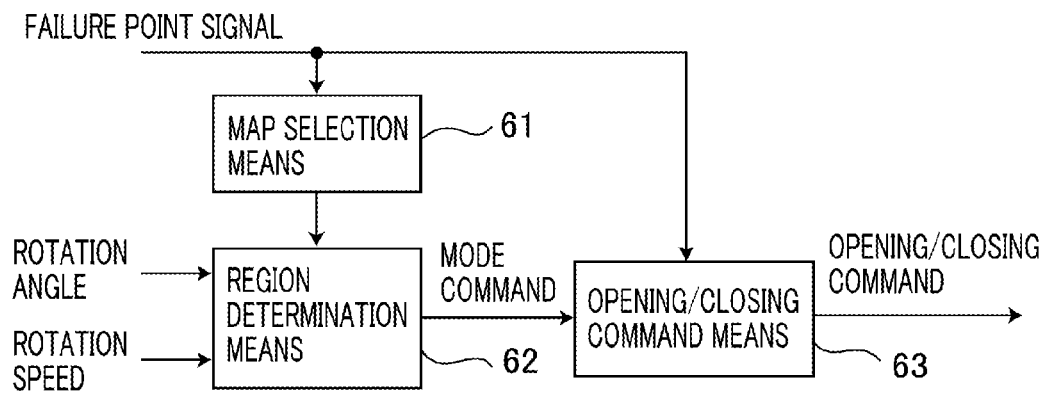
FIG. 8
|  |  | FAILURE PHASE | | |
|---|---|---|---|---|
|  |  | U | V | W |
| MODE | I | ALL ON | ← | ← |
|  | II | UR OFF OTHERS ON | VR OFF OTHERS ON | WR OFF OTHERS ON |
|  | III | ALL OFF | ← | ← |

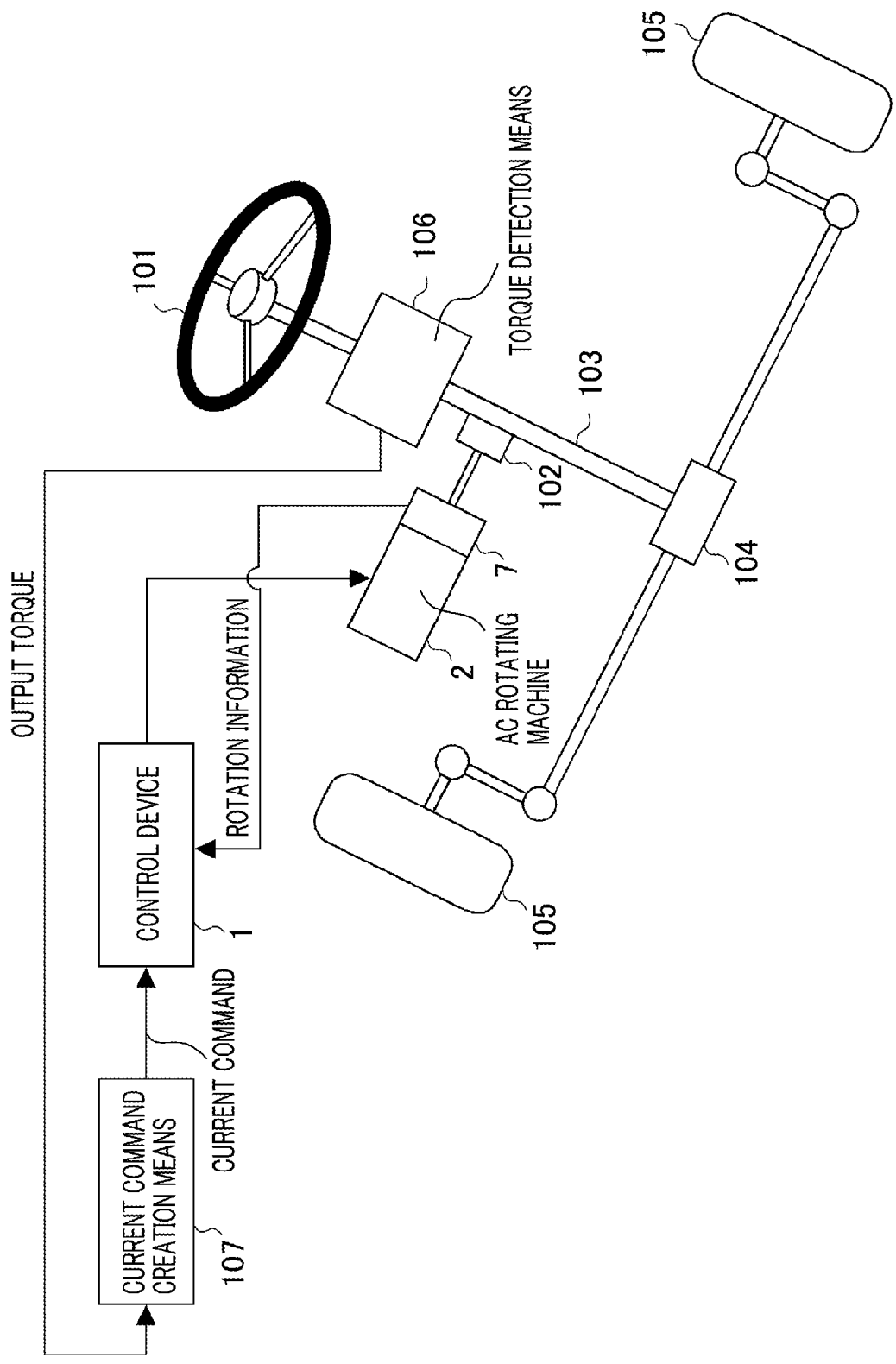

CONTROL DEVICE FOR AC ROTATING MACHINE AND ELECTRIC POWER STEERING DEVICE

CROSS REFERENCE TO RELATED APPLICATIONS

This application is a National Stage of International Application No. PCT/JP2014/057546, filed Mar. 19, 2014, the contents of which are incorporated herein by reference in its entirety.

BACKGROUND OF THE INVENTION

1. Field of the Invention

The present invention relates to a control device for an AC rotating machine and an electric power steering device utilizing the control device.

2. Description of the Related Art

An example of conventional device is disclosed in Patent Document 1. This device is an electric power steering device that can continuously support the operation of a steering wheel even when any one of two or more switching devices included in an electric power converter fails due to short-circuiting.

This electric power steering device is provided with three relays, i.e., switches provided between an electric-power conversion unit and a three-phase brushless motor; when any one of the switching devices fails due to short-circuiting, the control unit makes one of the relays disconnect the failed switching device from the brushless motor and then makes the electric-power conversion unit supply AC electric power to the brushless motor. As a result, two-phase AC electric power can be supplied to the brushless motor. Accordingly, the operation of the steering wheel can continuously be supported.

Another example of conventional device is disclosed in Patent Document 2. This device is a motor controller for a multiphase AC motor, in which when any one of the switching devices fails due to short-circuiting, an abnormal-time current control means generates an abnormal-time voltage command corresponding to the state of an abnormality so that current control is performed by the abnormal-time current control means instead of a normal-time current control means.

In this motor controller, when the rotation angle of the motor is within an angle range where it is difficult to prevent braking torque from being produced, the abnormal-time current control means temporarily issues an off-state command to the switching device of at least one phase. As a result, the brake torque can be minimized in the range where it is difficult to prevent the braking torque from being produced; concurrently, power-running torque can be outputted in other ranges.

Further another example of conventional device is disclosed in Patent Document 3. This is a controller having a multiphase rotating machine including two or more groups of windings and two- or more-system electric-power converters; when an on-failure occurs in one of switching devices, all the switching devices in the failed system are turned off so that the failed system is stopped from driving the motor; thus, the systems that have not failed are controlled so that braking torque produced in the failed system is cancelled.

[Patent Document 1] Japanese Patent Application Laid-Open No. 2009-35155
[Patent Document 2] Japanese Patent No. 4772116
[Patent Document 3] Japanese Patent Application Laid-Open No. 2011-78230

In such an device as disclosed in Paten Document 1, a relay disconnects a phase in which the switching device thereof has failed due to short-circuiting; therefore, one phase is opened. In this situation, at two angles per rotation of the AC rotating machine, outputtable torque becomes zero. Accordingly, there has been a problem that the torque ripple is large and the rotation speed of the rotating machine is liable to decrease at each of these angles. In such an device as described in Patent Document 2, instead of providing a relay, i.e., a switch in the connection path between an AC rotating machine and an electric-power converter, control of the switching device in the electric-power converter is made to conform to a failure state so that braking torque is minimized; however, there has been a problem that the braking torque cannot be made to be zero. For example, as represented in FIG. 19 of Patent Document 3, braking torque at a time of low-speed rotation can be made to be approximately zero, as shown in FIG. 19(*a*); however, braking torque at a time of high-speed rotation becomes large, as shown in FIG. 19(*b*). Moreover, in such an device as disclosed in Patent Document 3, two systems of windings and two systems of electric-power converters are provided; therefore, there has been a problem that the size of the device becomes large and the cost is hiked.

SUMMARY OF THE INVENTION

The present invention has been implemented in order to solve the foregoing problems; the objective thereof is to obtain a control device, for an AC rotating machine, that suppresses the size and the cost and that eliminates braking torque and reduces points at which torque is zero so that the output torque can be raised, when a switching device fails due to short-circuiting or when a short-to-ground fault or a short-to-power failure occurs in the path between the electric-power converter and the winding.

A control device for an AC rotating machine according to the present invention includes an electric-power converter that has two or more switching devices connected with an AC rotating machine and applies a voltage to the AC rotating machine, a switch that opens or closes an electric connection path between the AC rotating machine and the electric-power converter, a switching device control means that controls opening and closing of the switching devices, and a switch control means that controls opening and closing of the switch; when a failure occurs in the electric-power converter, the AC rotating machine, or the electric connection path therebetween, the switch control means controls opening and closing of the switch in accordance with rotation information on the AC rotating machine.

In the present invention makes it possible that when a failure occurs in the electric-power converter, the AC rotating machine, or the electric connection path therebetween, opening and closing of the switch is controlled in accordance with rotation information on the AC rotating machine; therefore, braking torque is eliminated in an operation region where without the switch, the braking torque is produced, and hence power-running torque, which is the same as or larger than zero, can be obtained. Moreover, the opening/closing device of a failure phase is not left always opened but is closed in accordance with the rotation state of the AC rotating machine; thus, the angle range where the torque becomes zero can be reduced. Furthermore, it is not required to make the control device for an AC rotating machine redundant by providing dual systems of winding and electric-power converter; therefore, the cost can be reduced without the size thereof being enlarged. As described above, the control device for an AC rotating machine according to the present invention demonstrates an unprecedented and remarkable effect.

Objectives, features, aspects, and advantages other than the foregoing objective of the present invention will become more apparent from the following detailed description of the present invention when taken in conjunction with the accompanying drawings.

BRIEF DESCRIPTION OF THE DRAWINGS

FIG. 6 is a graph representing a power-running torque region and a region where an electric current flows in a failed phase or braking torque is produced in an upper-side-failure mode II according to Embodiment 1 of the present invention;

FIG. 7 is a block diagram illustrating a switch control means according to Embodiment 1 of the present invention;

FIG. 8 is a table representing the relationship among the mode, the failed phase, and the command for the switch in an opening/closing command means according to Embodiment 1 of the present invention;

FIG. 19 is a block diagram illustrating an electric power steering device according to Embodiment 9 of the present invention.

DETAILED DESCRIPTION OF THE INVENTION

Embodiment 1

Figure 1:
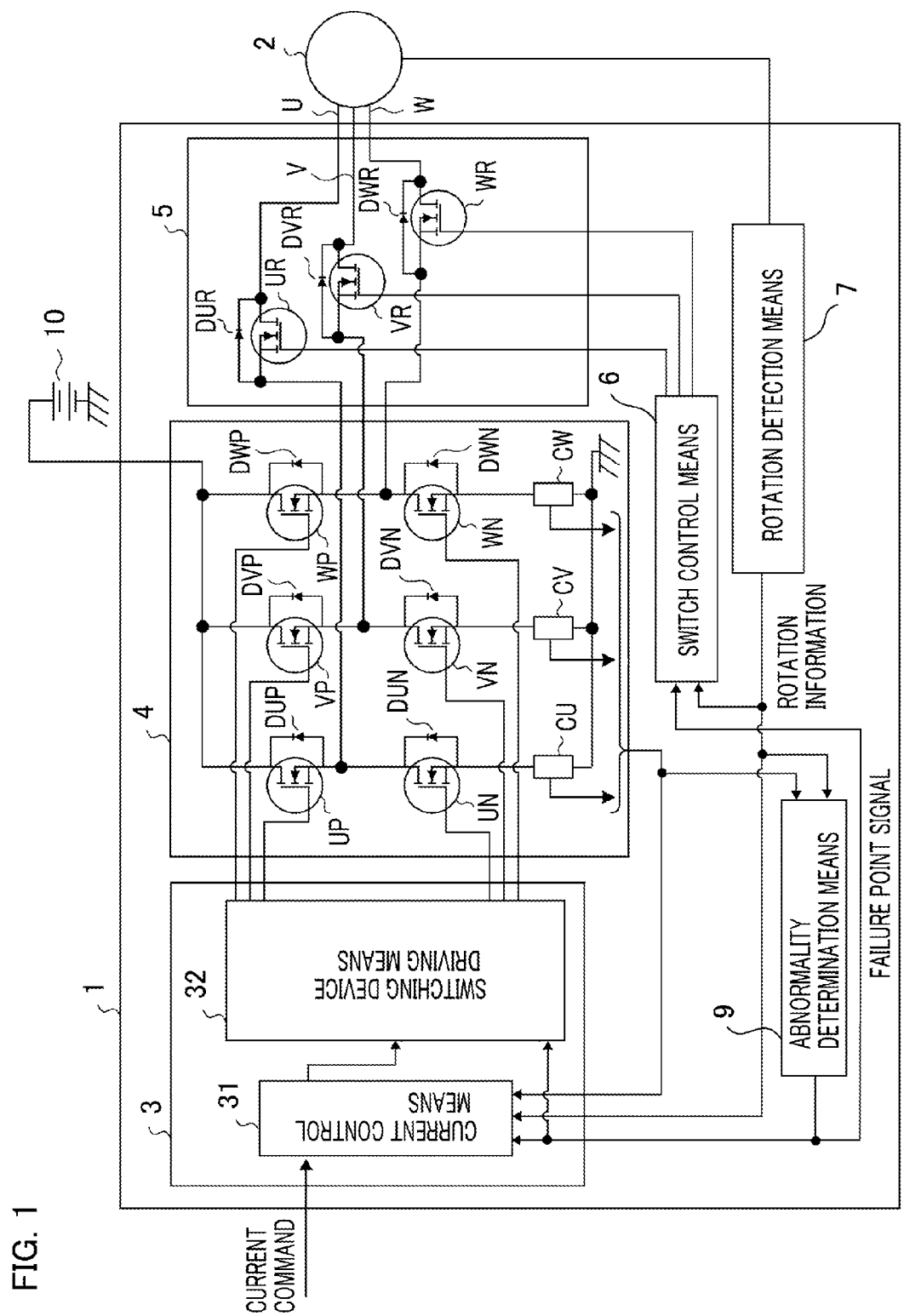
FIG. 1 is a block diagram illustrating a control device for an AC rotating machine according to Embodiment 1 of the present invention.

FIG. 1 is a diagram illustrating the configuration of a control device 1 for an AC rotating machine 2 and the vicinity thereof according to Embodiment 1 of the present invention. In FIG. 1, the AC rotating machine 2 and a power source 10 are provided in the vicinity of the control device 1. As the AC rotating machine 2, a publicly known motor, for example, a permanent magnet synchronous motor, a brushless motor, or the like my be utilized.

The control device 1 controls the AC rotating machine (referred to also as a motor, hereinafter) 2 provided with respective windings of three phases, i.e., U, V, and W phases. In the control device 1, a rotation detection means 7 for detecting rotation information on the motor 2 calculates the rotation angle and the rotation speed of the motor 2. In the control device 1, current detectors CU, CV, and CW detect electric currents that flow in the windings of the respective phases of the motor 2.

The control device 1 is provided with a switching device control means 3 including a current control means 31 that determines voltage commands for the three phases in accordance with a current command (referred to also as a q-axis current command) corresponding to a target value of the output torque of the motor 2, a rotation angle of the motor 2, and a detection current of each phase thereof and a switching device driving means 32 that applies PWM modulation to the voltage commands for the three phases from the current control means 31 and then commands an electric-power converter 4 to perform switching operation. The control device 1 is provided with the electric-power converter 4 that receives a switching operation signal from the switching device driving means 32 and then realizes chopper control of switching devices UP, UN, VP, VN, WP, and WN, each of which is formed of a MOSFET, so as to supply electric power to each of the phases of the motor 2 from the power source 10. In addition, the current control means 31 can determine the voltage commands for the three phases in accordance with the current command and the detection currents of the respective phases of the motor 2; therefore, the rotation angle of the motor is not necessarily required.

The currents that flow from the electric-power converter 4 to the respective phases of the motor 2 make the motor 2 produce torque. The current detector CU is disposed in series with the switching devices UP and UN; the current detector CV, the switching devices VP and VN; and the current detector CW, the switching devices WP and WN. In Embodiment 1, the current detectors CU, CV, and CW are arranged in series with the lower-side switching devices UN, VN, WN, respectively. Diodes DUP, DUN, DVP, DVN, DWP, and DWN are arranged in parallel with the switching devices UP, UN, VP, VN, WP, and WN, respectively. In general, these diodes are provided in order to protect the switching devices. The control device 1 is provided with an abnormality determination means 9 that performs determination of a short-circuit failure point, based on the detection current of each of the phases and the rotation angle of the motor.

As the abnormality determination means 9, for example, the abnormality detection means and the short circuit locating means disclosed in International Publication No. WO2008/129658 may be utilized. The abnormality determination means 9 detects a short-circuit failure that occurs in the electric-power converter 4, the AC rotating machine 2, or the electric connection paths thereof, locates the short-circuit failure point, and then outputs the failure point, as a failure point signal. For example, when the switching device UP fails due to short-circuiting or when the bus bar of the power source and the electric connection path between the switching device UP and the U-phase winding are short-circuited, i.e., when a short-to-power failure occurs in the U phase, information "UP" is outputted as a signal. As a detection subject, a short-circuit failure in each of the switching devices UP, UN, VP, VN, WP, and WN, or, as an equivalent failure thereof, a failure due to a short circuit between the electric connection path from the switching device to the motor winding and the bus bar of the power source or the ground-side bus bar is detected; then, a failure point signal therefor is outputted.

The current control means 31 is provided with a normal-time current control means to be utilized at a normal time when there exists no failure and an abnormal-time current control means to be utilized at an abnormal time when there exists a failure. The normal-time current control means may be configured based on a publicly known method such as the dq control; the detailed explanation will be omitted. The abnormal-time current control means performs control in which controlling configuration is switched in accordance with a failure state or rotation information so that an optimal voltage command for the failure or the rotation state is created.

A switch 5 includes opening/closing devices UR, VR, and WR, formed of a MOSFET, that are disposed on the wiring leads of the respective phases, which connect the electric-power converter 4 and the corresponding windings of the AC rotating machine 2 and diodes DUR, DVR, and DWR provided in parallel with the opening/closing devices UR, VR, and WR, respectively. In other words, the switch 5 in the present embodiment is an electronic switch configured with electronic devices. An electronic switch is smaller in size and more inexpensive than a mechanical switch.

A switch control means 6 controls the switch 5 in accordance with the failure point signal and the rotation information; the switch control means 6 creates opening commands or closing commands for the opening/closing devices UR, VR, and WR of the respective phases, and controls the opening and closing of the opening/closing devices UR, VR, and WR so that optimal torque is produced at a time when there exists a failure.

Next, there will be explained the case where an abnormality occurs in one of the phases of the AC rotating machine 2 or the electric-power converter 4, for example, the case where there occurs an abnormality in which a short circuit between the wiring lead linked to the negative potential (referred to also as the ground) of the power source and the U-phase motor wiring lead, the U-phase wiring lead of the electric-power converter 4, or the U-phase wiring lead that connects the AC rotating machine 2 with the electric-power converter 4 is caused or the case where the U-phase lower-side switching device UN is short-circuited, i.e., the case where a short-to-ground fault occurs in the U phase.

At first, there will be explained the output torque at a time when in the case where the U-phase lower-side switching device UN is short-circuited, the opening/closing devices UR, VR, and WR of all the phases are closed. The mode in which the switch 5 is closed, i.e., the opening/closing devices UR, VR, and WR of all the phases are closed is referred to as a mode I. As described in the foregoing paragraph of "Problems to be Solved by the Invention", the region of torque in the mode I is divided into a region where power-running torque can be outputted and a region where braking torque is produced. For example, as represented in FIG. 19 of Patent Document 3, braking torque at a time of low-speed rotation can be made to be approximately zero, as shown in FIG. 19(a); however, at a time of high-speed rotation, braking torque is enlarged, as shown in FIG. 19 (b), and the angle range where braking torque is produced is widened. This phenomenon has the characteristics represented in FIG. 2. That is to say, in FIG. 2, with regard to the rotation angle and the rotation speed of the motor, the dotted region is the one where braking torque is produced, and the white region is the one where power-running torque is produced.

Next, there will be explained the output torque at a time when in the case where the U-phase lower-side switching device UN is short-circuited, only the failure-phase opening/closing device, i.e., only the U-phase opening/closing device is opened and all other opening/closing devices are closed. The mode in which only the failure-phase opening/closing device is opened is referred to as a mode II. The condition in the mode II is approximately the same as the condition at a time when the U-phase opening/closing device is opened. In this regard, however, the diode DUR connected in parallel with the opening/closing device UR is turned on when the voltage at the motor side thereof becomes lower than the voltage of the ground; thus, the condition in the mode II is not perfectly the same as the condition where the U-phase opening/closing device is opened.

The torque in the mode II will be explained with reference to FIG. 3. The torque in the mode II is approximately the same as the condition where the U-phase opening/closing device is opened; the torque becomes zero at 90° and 270°, as represented by the thick lines. The torque waveform at that time is represented in FIG. 4, as described above. The diode DUR is turned on at a time of high-speed rotation; therefore, in the dotted region, braking torque is produced or an electric current is produced in the failure phase. The white regions other than the thick solid lines and the dotted region are regions where power-running torque can be produced.

The output torque at a time when in the case where a short-circuit failure occurs in the U-phase lower-side switching device UN, the all-phase opening/closing devices UR, VR, and WR are opened becomes zero in all the regions. The condition where the all-phase opening/closing devices UR, VR, and WR are opened is referred to as a mode III. As described above, the range where power-running torque can be produced changes depending on whether the opening/closing devices are opened or closed; therefore, the torque can be optimized by utilizing this characteristic. The modes I, II, III defined in the above description will be collectively listed below.

Mode I: the condition where the all-phase opening/closing devices are closed

Mode II: the condition where only the failure-phase opening/closing device is opened and all other ones are closed Mode III: the condition where the opening/closing devices of all the phases are opened Next, there will be explained the operation of each of the switch control means 6 and the switching device control means 3 at a time when a short-circuit failure occurs in the U-phase lower-side switching device UN. When such an abnormality occurs, the abnormality determination means 9 supplies a failure point signal indicating that "the U-phase lower-side switching device is abnormal" to the switching device control means 3 and the switch control means 6.

Figure 2:
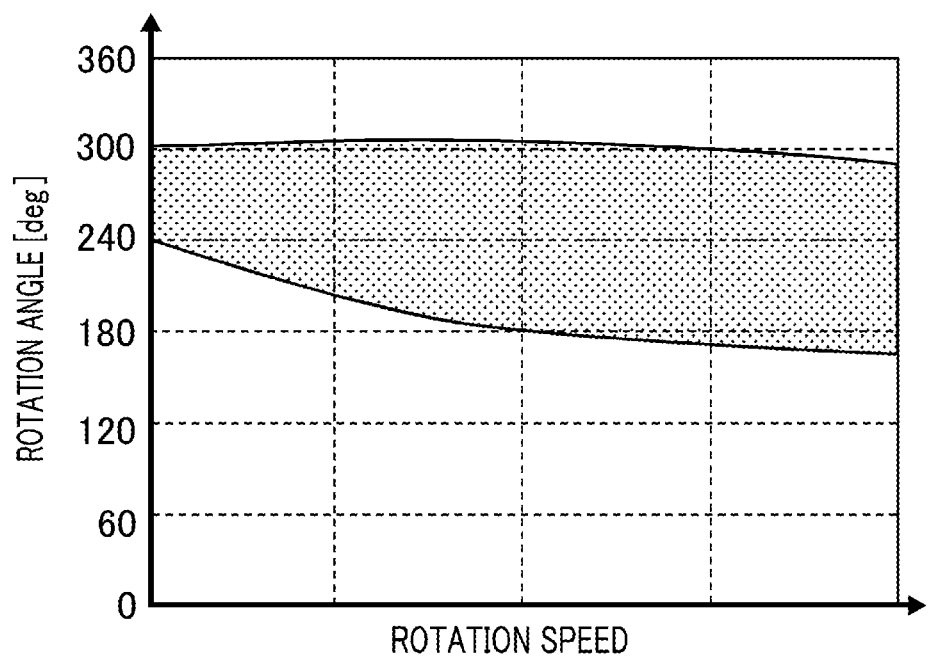
FIG. 2 is a graph representing a power-running torque region and a braking torque region (torque region map) in a lower-side-failure mode I according to Embodiment 1 of the present invention.

The switch control means 6 is configured as illustrated in FIG. 7; a map selection means 61 selects a map corresponding to a failure point signal. In this embodiment, the map denotes a relationship chart (referred to also as a torque region map) that, as FIG. 2 described above, represents the region of power-running torque with regard to the rotation angle and the rotation speed; the maps may be mounted by use of a table or the like. FIG. 2 represents the condition in the mode I where a failure occurs in the U-phase lower-side switching device, i.e., the condition where the opening/closing devices of all the phases are closed; however, in the case where a failure occurs in the U-phase upper-side switching device, the map of power-running torque has a shape, as in FIG. 5, obtained by rotating the shape in FIG. 2 by 180°.

Although not represented, in the case where a failure occurs in the V phase, a characteristic shifted by 120° is obtained; in the case where a failure occurs in the W phase, a characteristic shifted by 240° is obtained. In the case where a short-circuit failure occurs in the U-phase lower-side switching device, there is selected the map, in FIG. 2, that represents the power-running-possible region in the mode I where the all-phase opening/closing devices are closed.

Next, a region determination means 62 refers to the map selected by the map selection means 61 in accordance with the rotation angle and the rotation speed and then transfers a mode command for commanding an opening/closing command means 63 to perform switching among the mode I, the mode II, and the mode III. When a short-circuit failure occurs in the U-phase lower-side switching device, the mode command is created in accordance with FIG. 2, which is the torque region map for the mode I, in such a way that when the operating points of the rotation angle and the rotation speed are within the white power-running-possible region, the mode I is selected, i.e., the opening/closing devices of all the phases are closed. The mode command is created in accordance with FIG. 2, which is the torque region map for the mode I, in such a way that when the operating points of the rotation angle and the rotation speed are within the dotted braking torque region, the mode II is selected, i.e., only the failure-phase opening/closing device is opened.

Next, after receiving the mode command, the opening/closing command means 63 closes the opening/closing devices of all the phases in accordance with a table represented in FIG. 8 when the mode command indicates the mode I; when the mode command indicates the mode II, the opening/closing command means 63 opens only the failure-phase, i.e., the U-phase opening/closing device; when the mode command indicates the mode III, the opening/closing command means 63 opens the opening/closing devices of all the phases. In this example, the mode III is not utilized.

In the mode I, as the switching device control means 3, there may be utilized a control method such as the abnormal-time current control means, disclosed in Patent Document 2, for the case where a short-circuit failure occurs in the switching device or in one phase. The abnormal-time current control means turns off the abnormal-phase switching device in the electric-power converter 4 so that the said switching device stops driving, and then continues the control by use of the switching devices of the two normal phases; furthermore, the abnormal-time current control means receives the difference between a phase-current command and a detection current and then creates an abnormal-time voltage command in accordance with a value obtained by performing addition or subtraction between a normal-phase current difference and an abnormal-phase current difference. In the mode II, a control means such as the abnormal-time current control means disclosed in Japanese Patent No. 4498353 may be utilized. This abnormal-time current control means turns off the abnormal-phase switching device in the electric-power converter 4 so that the said switching device stops driving, and then continues the control by use of the switching devices of the two remaining normal phases; the abnormal-time current control means generates voltage commands for the respective phases in such a way that there is satisfied an equilibrium condition that the summation of the voltage commands for the respective normal phases other than the phase where there exists an abnormality becomes zero, and then outputs these commands, as the abnormal-time voltage commands; the phase current command is calculated in accordance with the reciprocal of the cosine of the rotation angle or calculated in accordance with the rotation direction in such a way that the phase current command becomes larger as the rotation angle approaches the angle at which torque is zero. Control suitable for each failure point can be realized.

Figure 9:
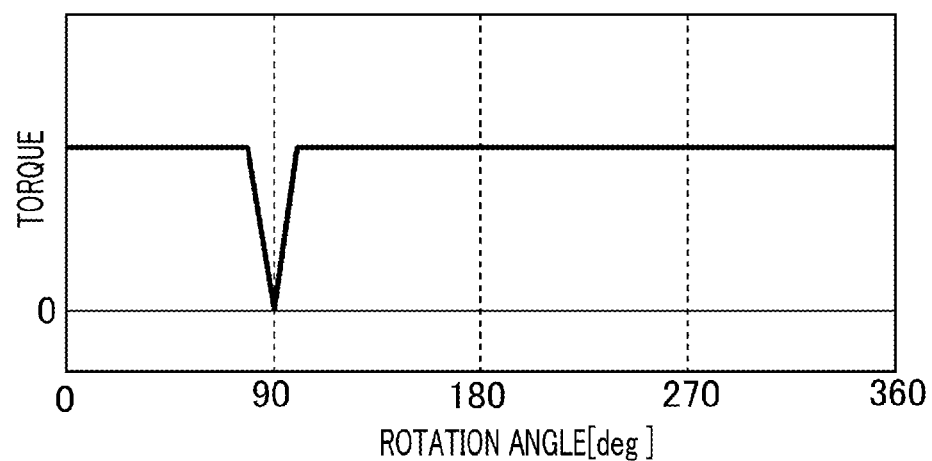
FIG. 9 is a graph representing torque that can be realized at a time of a lower-side failure according to Embodiment 1 of the present invention.

As a result, the operating points of the rotation angle and the rotation speed do not exist in the braking torque region of the mode I; thus, braking torque can be prevented. As a result, only in the region, out of the whole region, where the rotation angle is 270°, the torque becomes zero; in all other regions other than that region, the power-running torque can be outputted. In other words, the torque as represented in FIG. 9 can be outputted regardless of the value of the rotation speed. When the conventional method disclosed in Patent Document 1 and the present embodiment are compared with each other, it can be seen that there exist two angles at which the torque is zero, as represented in FIG. 4, in the device disclosed in Paten Document 1, but there exists only one angle in the device according to the present embodiment; thus, it suggests that the output torque can be raised. Moreover, in the case of the method disclosed in Patent Document 2, only the torque the same as that in the mode I can be outputted and hence braking torque is produced; in contrast, in the present embodiment, the output torque can be raised.

In the foregoing description, the map selection means 61 selects the torque region map of the mode I; therefore, the map selection means 61 may select the torque region map of the mode II. In that case, when the rotation operating points exist on the 90-degree thick lime of the mode II, in the dotted region thereof, and in their vicinity thereof, the mode I is commanded, and in other cases, the mode II is commanded, so that an effect the same as that in the foregoing description can be obtained.

Hereinafter, there will be explained the case where there occurs an abnormality that the U-phase motor wiring lead, the U-phase wiring lead of the electric-power converter, or the U-phase wiring lead connecting the AC rotating machine with the electric-power converter and the wiring lead linked to the positive potential of the power source (referred to also as the power source voltage) are short-circuited or that the u-phase upper-side switching device UP is short-circuited, i.e., the case where a short-to-power fault occurs in the U phase.

Figure 5:
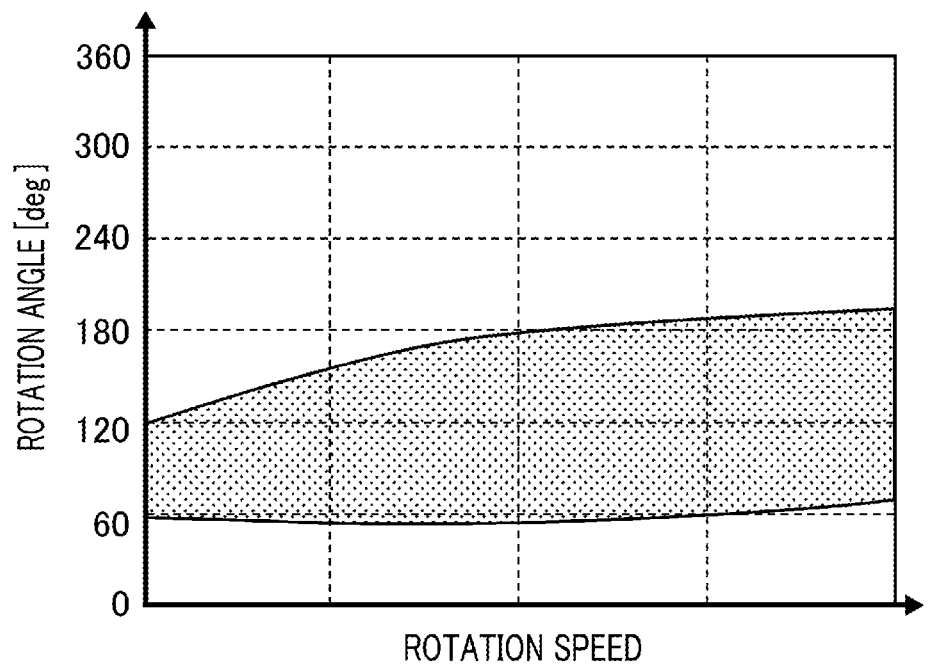
FIG. 5 is a graph representing a power-running torque region and a braking torque region (torque region map) in an upper-side-failure mode I according to Embodiment 1 of the present invention.

At first, FIG. 5 represents the output torque at a time when in the case where a short-circuit failure occurs in the U-phase upper side, the opening/closing devices of all the phases are closed, i.e., the output torque in the mode I at a time when a failure occurs in the U-phase upper side. With regard to the rotation angle and the rotation speed of the motor, the dotted region is the one where braking torque is produced, and the white region is the one where power-running torque is produced. Next, there will be explained the output torque in the mode II where in the case where the U-phase lower-side switching device is short-circuited, only the failure-phase opening/closing device, i.e., only the U-phase opening/closing device is opened and all other opening/closing devices are closed. In this mode, the diode DUR connected in parallel with the opening/closing device UR is turned on when the voltage at the motor side thereof becomes lower than the voltage of the power source; thus, the diode DUR is likely to be turned on.

Accordingly, as far as the torque in this situation is concerned, the dotted region, as represented in FIG. 6, is the one where the diode DUR is turned on and braking torque is produced or an electric current is produced in the failure phase. The white region other than the thick solid line and the dotted region is a region where power-running torque can be produced without letting any electric current flow in the failure phase. The output torque at a time when in the case where a short-circuit failure occurs in the U-phase upper-side switching device, the opening/closing devices UR, VR, and WR of all the phases are opened becomes zero in all the regions.

Next, there will be explained the operation of each of the switch control means and the switching device control means at a time when a short-circuit failure occurs in the U-phase upper-side switching device UP. When such an abnormality occurs, the abnormality determination means 9 supplies a failure point signal indicating that "the U-phase upper-side switching device is abnormal" to the switching device control means 3 and the switch control means 6.

When a short-circuit failure occurs in the U-phase upper-side switching device, the map selection means 61 selects the torque region map (FIG. 5) for the mode I where a U-phase upper-side failure occurs and the opening/closing devices of all the phases are closed. When the operating points of the rotation angle and the rotation speed are within the white power-running-possible region, the mode command is created, in accordance with the torque region map for the mode I at a time of the U-phase upper-side failure, so that the mode I is selected, i.e., the opening/closing devices of all the phases are closed. The mode command is created in accordance with FIG. 5, which is the torque region map for the mode I, in such a way that when the operating points of the rotation angle and the rotation speed are within the braking torque region, the mode III is selected, i.e., the all-phase opening/closing devices are opened. In the mode III, it is not required to make the switching device control means 3 operate; it is only necessary to turn off all the switching devices.

Figure 10:
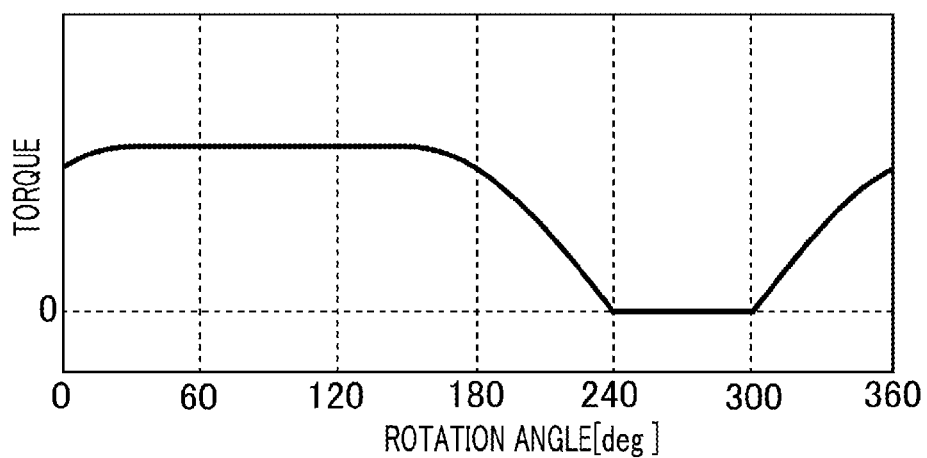
FIG. 10 is a graph representing torque that can be realized at a time of an upper-side failure according to Embodiment 1 of the present invention.

As a result, the operating points of the rotation angle and the rotation speed do not exist in the braking torque region of the mode I; thus, braking torque can be prevented. As a result, only in the region, out of the whole region of FIG. 5, where the rotation angles are expressed by dots, the torque becomes zero; in all other regions other than that region, the power-running torque can be outputted. When the conventional device according to Patent Document 1 is applied to the circuit configuration, illustrated in FIG. 1, that utilizes electronic switches each including a MOS-FET and a diode, braking torque is likely to be produced because the diodes in the switches are likely to turn on; therefore, as far as the output torque is concerned, braking torque becomes large at a time of high-speed rotation, as represented in FIG. 19(*b*) of Patent Document 3. In contrast, the present embodiment makes it possible to completely eliminate braking torque, as represented in FIG. 10, and hence the output torque can be raised. Moreover, in the case of the method disclosed in Patent Document 2, only the torque the same as that in the mode I can be outputted and hence braking torque is produced; in contrast, in the present embodiment, the output torque can be raised.

As described above, the control device for an AC rotating machine according to the present embodiment includes an electric-power converter that has two or more switching devices connected with an AC rotating machine and applies a voltage to the AC rotating machine, a switch that opens or closes an electric connection path between the AC rotating machine and the electric-power converter, a switching device control means that controls opening and closing of the switching devices, and a switch control means that controls opening and closing of the switch; when a failure occurs in the electric-power converter, the AC rotating machine, or the electric connection path therebetween, the switch control means controls opening and closing of the switch in accordance with rotation information. As a result, it is made possible that when a failure occurs in the electric-power converter, the AC rotating machine, or the electric connection path therebetween, braking torque is eliminated in an operation region where the braking torque is liable to be produced and hence power-running torque, which is the same as or larger than zero, is obtained; furthermore, the opening/closing device of a failure phase is not left always opened and is closed in accordance with a rotation state; thus, the angle range where the torque becomes zero can be reduced. Moreover, not only the output torque can be raised, but also it is not required to make the control device for an AC rotating machine redundant by providing two systems of winding and electric-power converter; therefore, the size is not enlarged and hence the cost can be reduced.

Furthermore, when a failure occurs in the electric-power converter, the AC rotating machine, or the path therebetween, the switching device control means controls the voltage by switching opening and closing of the switching devices; therefore, in accordance with the state of the switch and the failure contents, optimum abnormal-time current control can be performed and hence the output torque can be raised.

Furthermore, when a failure occurs in the electric-power converter, the AC rotating machine, or the path therebetween, the switch control means repeats opening and closing of the phase in which the failure has occurred and keeps other phases from being connected; therefore, it is made possible that the failure phase is utilized only in the rotation region where no braking torque occurs and, in other rotation regions, the control is performed through two phases where no failure has occurred; thus, the output torque can be raised.

Moreover, when a failure occurs in the electric-power converter, the AC rotating machine, or the path therebetween, the switch control means repeats opening and closing of all the phases; therefore, it is made possible that all the phases are utilized only in the rotation region where no braking torque occurs and, in other rotation regions, the braking torque is eliminated by shutting off all the phases; thus, the output torque can be raised.

Moreover, when a failure occurs in the electric-power converter, the AC rotating machine, or the path therebetween, the switch control means opens the opening/closing device of the phase where the failure has occurred, when power running with all the opening/closing devices closed cannot be performed; therefore, it is made possible that the failure phase is utilized only in the rotation region where power running is possible and, in other rotation regions, the control is performed through two phases where no failure has occurred; thus, the output torque can be raised.

Moreover, when a failure occurs in the electric-power converter, the AC rotating machine, or the path therebetween, the switch control means opens all the opening/closing devices, when power running with all the opening/closing devices closed is not possible; therefore, it is made possible that all the phases are utilized only in the rotation region where power running is possible and, in other rotation regions, the braking torque is eliminated by shutting off all the phases; thus, the output torque can be raised.

Furthermore, the switch is an electronic switch in which a device for cutting off a unidirectional electric current, i.e., a diode is utilized, and when a failure occurs in the electric-power converter, the AC rotating machine, or the path therebetween, the switch control means repeats opening and closing of the switch; therefore, the size of the control device for an AC rotating machine can be reduced in comparison with the control device utilizing a mechanical switch, and the output torque can be raised.

Although, in the present embodiment, each of the diodes in the switch is disposed in the direction from the electric-power converter to the motor, each of the diodes may be disposed in the opposite direction; in that case, the characteristic at a time of the upper-side failure and the characteristic at a time of the lower-side failure are just replaced by each other; thus, when in accordance with that replacement, the operation of the switch control means is replaced by the symmetrical operation, the same effect can be demonstrated.

Embodiment 2

In Embodiment 1, described above, the switch 5 is configured with electronic opening/closing devices, each of which includes MOSFETs and diodes, i.e., electronic devices. Embodiment 2 and Embodiment 1 differ from each other in that the control device according to Embodiment 2 includes a mechanical switch and in that the respective operation methods, at a time of a short-to-power failure including a short-circuit failure in the upper-side switching device, of the switch control means in Embodiments 1 and 2 differ from each other; the other configurations in Embodiment 2 are the same as those in Embodiment 1.

Figure 11:
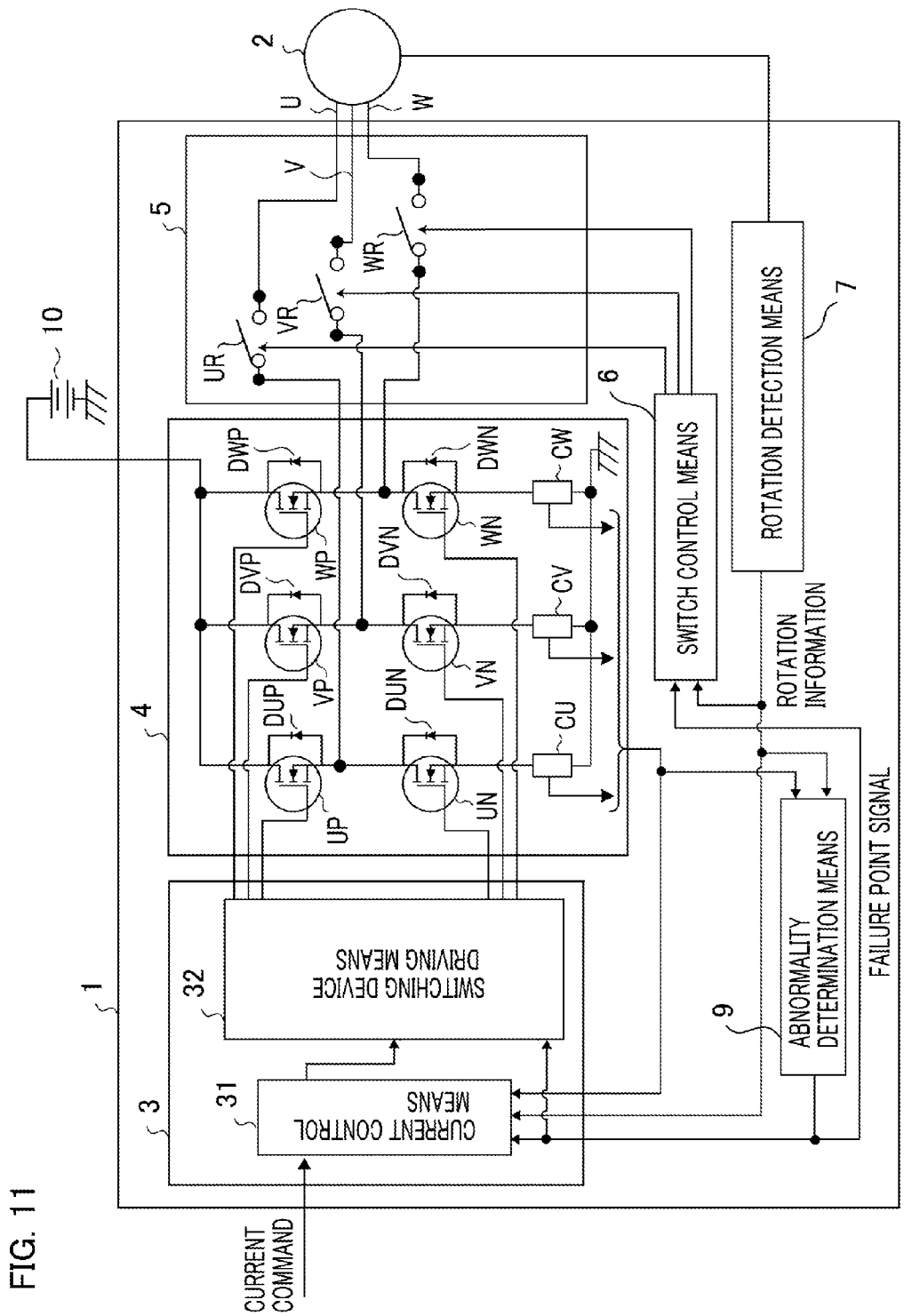
FIG. 11 is a block diagram illustrating a control device for an AC rotating machine according to Embodiment 2 of the present invention.

FIG. 11 illustrates the control device 1 according to the present embodiment. Because the switch is a mechanical one, it is not required to connect a diode in parallel with an opening/closing device; thus, bidirectional electric currents can be cut off by opening the opening/closing device.

Figure 12:
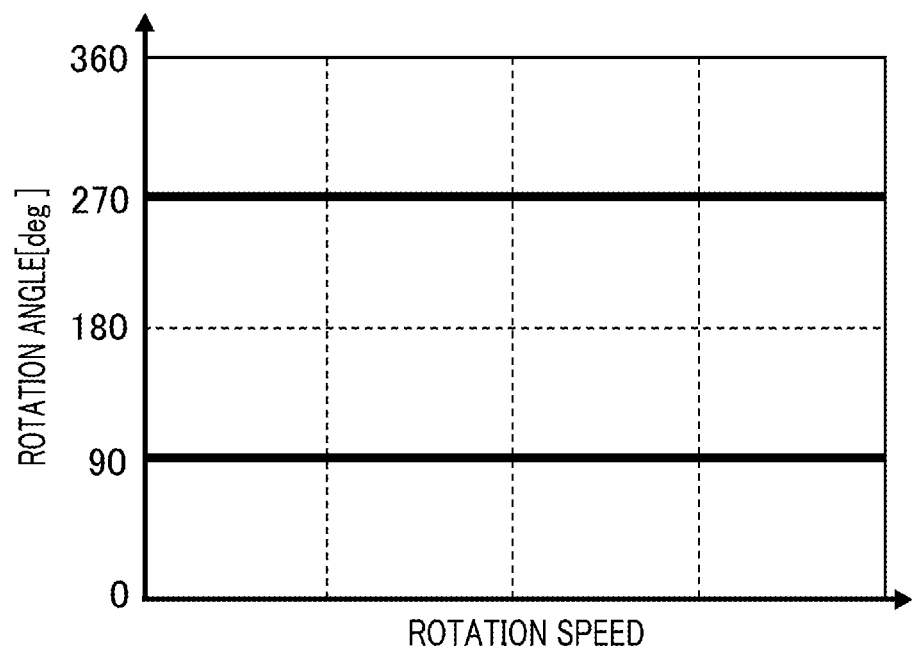
FIG. 12 is a graph representing a power-running torque region and a region where torque is zero in a mode II according to Embodiment 2 of the present invention.

As is the case with Embodiment 1, a short-circuit failure in the U phase, as the representative of all the phases, will be explained. The mode I, which is the state where all-phase opening/closing devices are closed, is the same as that in Embodiment 1, as a matter of course. In the mode II in which only the opening/closing device of the U phase where there exists a failure is opened, the respective characteristics at a time of a short-to-power failure including a short-circuit failure in the upper-side switching device and at a time of a short-to-ground failure including a short-circuit failure in the lower-side switching device of the U phase are the same as each other; thus, as represented in FIG. 12, torque is zero only at the 90-degree and 270-degree thick solid lines, and in the other region, power-running torque is possible. Because only the mechanical opening/closing device of one phase is opened, the torque becomes the one at a time when one phase is opened. The waveform thereof is represented in FIG. 4.

There will be explained the operation of each of the switch control means 6 and the switching device control means 3 at a time when a short-circuit failure occurs in the U-phase upper-side switching device. When such an abnormality occurs, the abnormality determination means 9 supplies a failure point signal indicating that "the U-phase upper-side switching device is abnormal" to the switching device control means 3 and the switch control means 6.

When a short-circuit failure occurs in the U-phase upper-side switching device, the map selection means 61 selects the torque region map (FIG. 5) for the mode I where a U-phase upper-side failure occurs and the opening/closing devices of all the phases in the switch 5 are closed. When the operating points of the rotation angle and the rotation speed are within the white power-running-possible region, the mode command is created, in accordance with the torque region map for the mode I at a time of the U-phase upper-side failure, so that the mode I is selected, i.e., the opening/closing devices of all the phases in the switch 5 are closed. The mode command is created in accordance with FIG. 5, which is the torque region map for the mode I, in such a way that when the operating points of the rotation angle and the rotation speed are within the braking torque region, the mode II is selected, i.e., only the failure-phase opening/closing device is opened.

Figure 13:
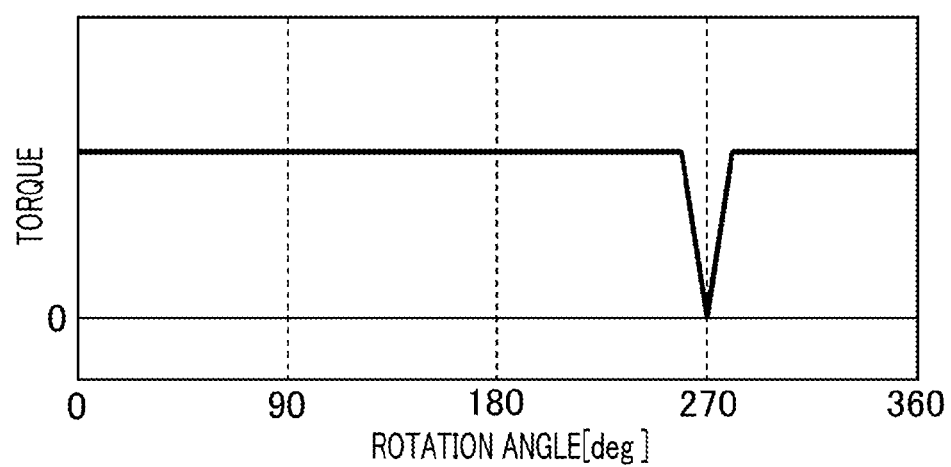
FIG. 13 is a graph representing torque that can be realized at a time of an upper-side failure according to Embodiment 2 of the present invention.

As a result, the operating points of the rotation angle and the rotation speed do not exist in the braking torque region of the mode I; thus, braking torque can be prevented. As a result, only in the region, out of the whole region, where rotation angle is 90°, the torque becomes zero; in all other regions other than that region, the power-running torque can be outputted. In other words, the torque as represented in FIG. 13 can be outputted regardless of the value of the rotation speed. When the conventional device disclosed in Patent Document 1 and the present embodiment are compared with each other, it can be seen that there exist two angles at which the torque is zero, as represented in FIG. 4, in the device disclosed in Paten Document 1, but there exists only one angle in the device according to the present embodiment; thus, it suggests that the output torque can be raised. Moreover, in the case of the method disclosed in Patent Document 2, only the torque the same as that in the mode I can be outputted and hence braking torque is produced; in contrast, in the present embodiment, the output torque can be raised.

The opening/closing device can cut off bidirectional electric currents, and when a failure occurs in the electric-power converter, the AC rotating machine, or the path therebetween, the switch control means repeats opening and closing of the opening/closing device; therefore, there exists only one region where the torque becomes zero and hence the output torque can be raised.

Embodiment 3

In Embodiment 2, described above, the switch 5 is a mechanical one; the present embodiment differs from each of Embodiments 1 and 2 in that in each of the phased, two electronic opening/closing devices each configured with a MOSFET and a diode are provided in the directions that are opposite to each other; the other configurations in the present embodiment is the same as those in each of Embodiments 1 and 2.

Figure 14:
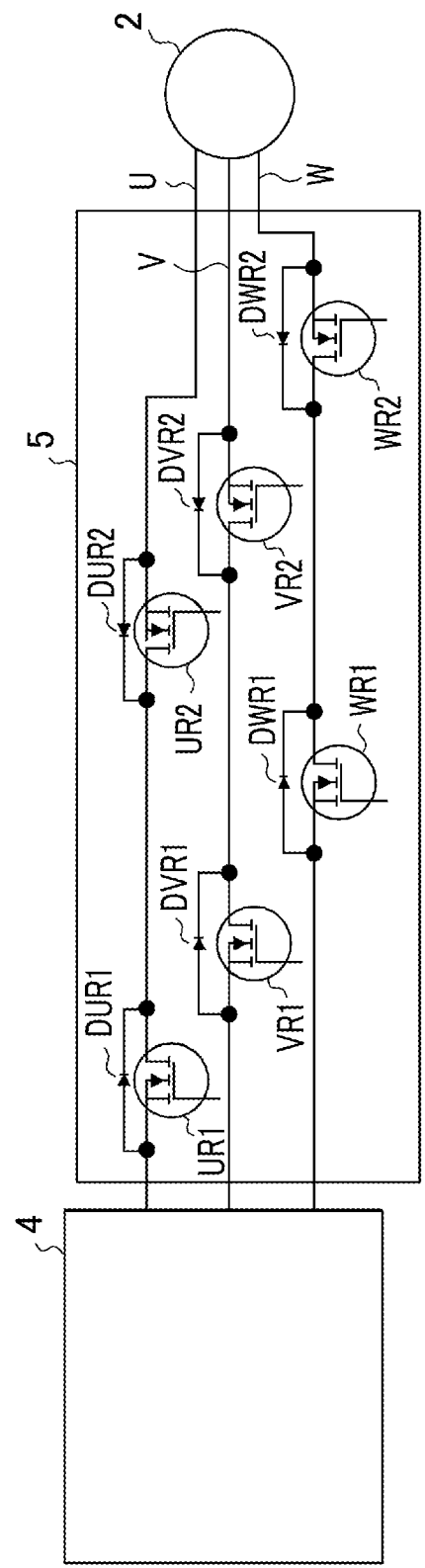
FIG. 14 is a view illustrating the configuration of a switch according to Embodiment 3 of the present invention.

FIG. 14 illustrates the control device 1 according to the present embodiment. Because two electronic opening/closing devices are provided in the directions that are opposite to each other, bidirectional electric currents can be cut off by opening the opening/closing devices. That is to say, an effect the same as that of Embodiment 2 in which mechanical opening/closing devices are utilized can be demonstrated.

Figure 15:
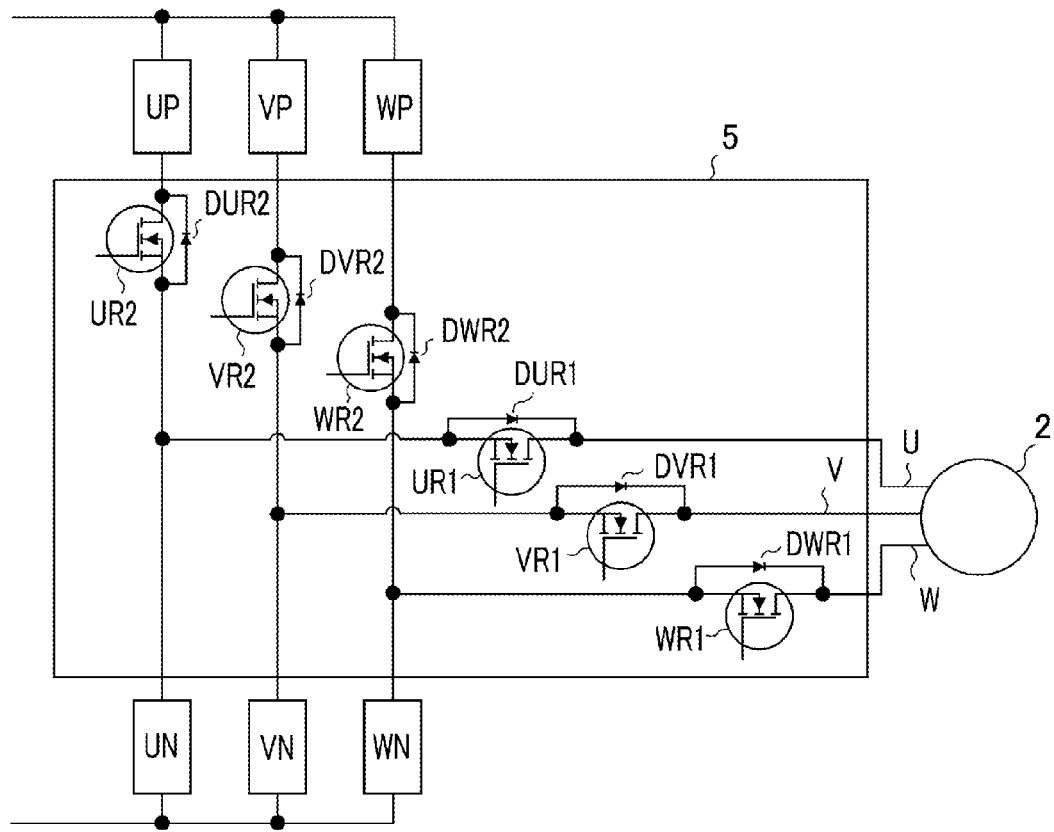
FIG. 15 is a view illustrating a variant example of configuration of the switch according to Embodiment 3 of the present invention.

As a variant example of arrangement of electronic opening/closing devices, the configuration illustrated in FIG. 15 may be utilized. Because an electronic opening/closing device is connected in series with the upper-side switching device, bidirectional electric currents can be cut off when an upper-side short-circuit failure occurs; thus, as is the case with the configuration in FIG. 14, the mode II where only the failure phase is cut off can be realized. Accordingly, the same effect can be demonstrated.

Embodiment 4

Embodiment 4 differs from. Embodiment 1 in the operation of a switch control means at a time of a short-to-ground failure including a short-circuit failure in the lower-side switching device; the other configuration in Embodiment 4 is the same as those in Embodiment 1.

In Embodiment 1, the map selection means selects the torque region map for the mode I; however, in Embodiment 4, the torque region map for the mode II (FIG. 3) is selected at a time of a short-to-ground failure including a short-circuit failure in the lower-side switching device. The region determination means 62 creates mode commands in such a way that the mode III is commanded when the rotation operating points exist in the dotted region, which is the torque region map for the mode II, and in such a way that the mode II is commanded when the rotation operating points exist in other regions.

Figure 3:
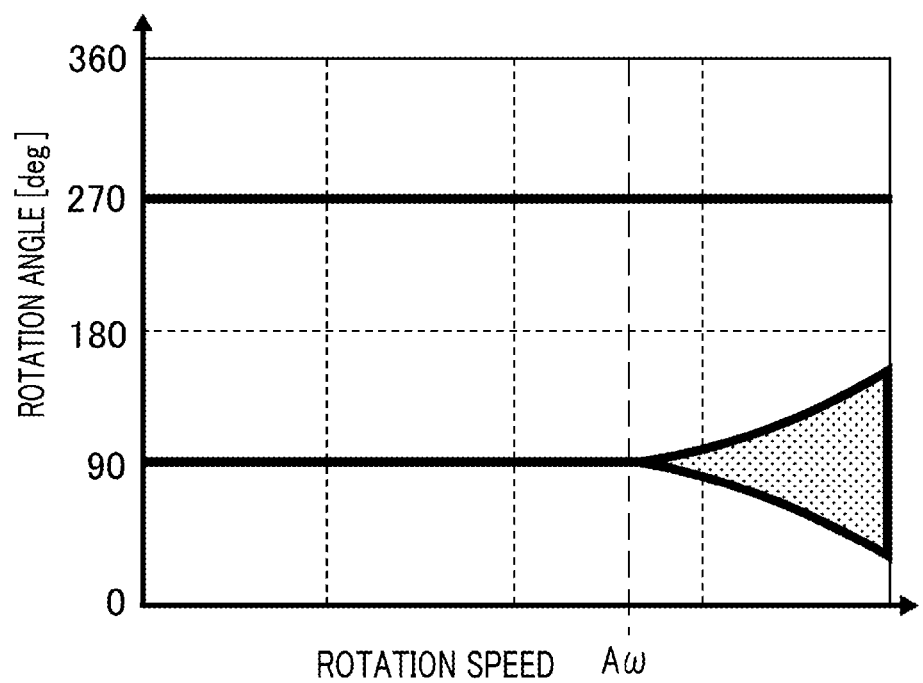
FIG. 3 is a graph representing a power-running torque region and a region where an electric current flows in a failed phase or braking torque is produced (torque region map) in a lower-side-failure mode II according to Embodiment 1 of the present invention.
Figure 4:
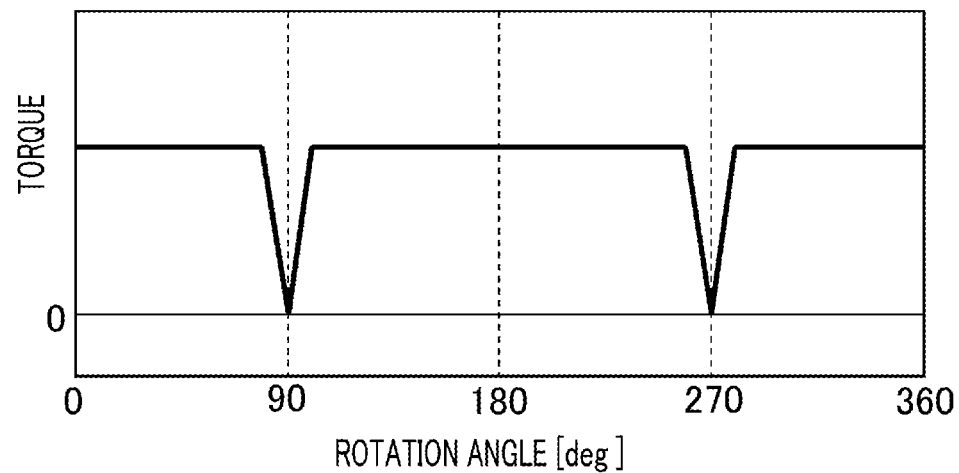
FIG. 4 is a graph representing the relationship between the torque and the rotation angle in a U-phase open state according to Embodiment 1 of the present invention.

As a result, at a time of a short-to-ground failure including a short-circuit failure in the lower-side switching device, the torque becomes zero, due to the mode III, only in the dotted region in FIG. 3; however, the output torque, which becomes zero only at two rotation angles in FIG. 4, can be obtained in almost all rotation region and hence the output torque can be raised.

When a failure occurs in the electric-power converter, the AC rotating machine, or the path therebetween, the switch control means keeps the phase where the failure has occurred opened and repeats opening and closing of all other phases; therefore, the output torque can be raised with the opening/closing device of the failure phase left opened.

Moreover, when a failure occurs in the electric-power converter, the AC rotating machine, or the path therebetween, the switch control means opens all the opening/closing devices when power running cannot be performed with the opening/closing device of the failure phase opened; therefore, it is made possible that the phases other than the failure phase are utilized only in the rotation region where power running is almost possible and, in other rotation regions, the braking torque is eliminated by shutting off all the phases; thus, the output torque can be raised.

Embodiment 5

In the foregoing embodiment 1, the switch control means 6 creates the mode command, based on the two rotation information items, i.e., the rotation angle and the rotation speed. The present embodiment differs from the Embodiment 1 in that the mode command is created by use of only the rotation speed as the rotation information and in that the switch is simply configured not in such a way that the opening/closing devices are individually opened or closed but in such a way that the opening/closing devices of all the phased are concurrently opened or closed; the other configurations in Embodiment 5 are the same as those in Embodiment 1.

Figure 16:
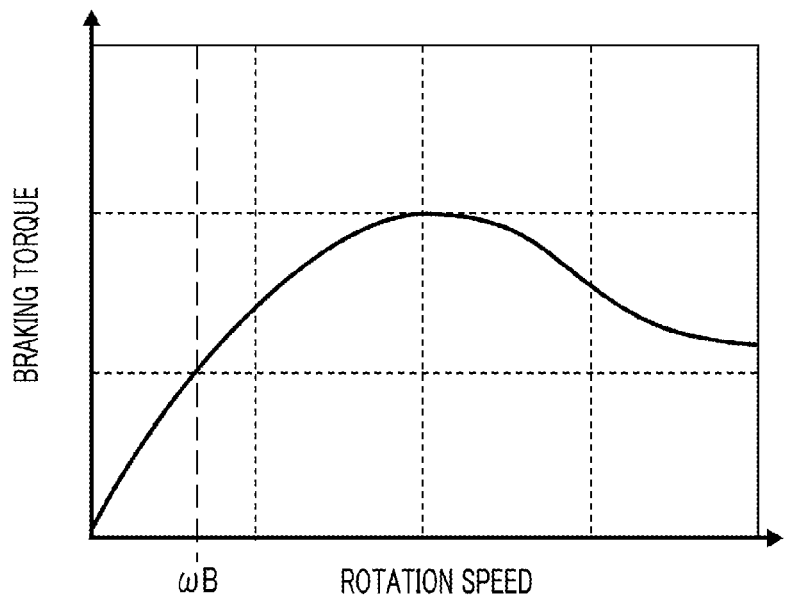
FIG. 16 is a graph representing the relationship between the rotation speed and the braking torque according to Embodiment 5 of the present invention.

The braking torque produced in the dotted region of the torque region map for the mode I at a time of a U-phase failure becomes larger as the rotation speed becomes higher; the relationship therebetween is represented in FIG. 16. According to FIG. 16, in the region where the rotation speed is lower than $\omega B$, the braking torque is small, i.e., the half of the maximum value or smaller. Accordingly, the mode I is utilized in the low-speed region and the mode III is utilized in the high-speed region, so that in the low-speed region, the power-running torque can almost fully be outputted and so that in the high-speed region, the brake is prevented from becoming dominant and hence it is made possible to make the torque zero.

Next, the operation of the switch control means will be explained. The map selection means selects FIG. 16; the region determination means compares the rotation speed with a rotation speed threshold value $\omega B$ and creates mode commands in such a way that in the case where the rotation speed is smaller than the rotation speed threshold value $\omega B$, the mode I is commanded and in the case where the rotation speed is larger than the rotation speed threshold value $\omega B$, the mode III is commanded.

Accordingly, in the low-speed region, the power-running torque can almost fully be outputted, as represented in FIG. 19(a) of Patent Document 3, and in the high-speed region, the braking torque is prevented from becoming dominant, as represented in FIG. 19(b), and hence it is made possible to make the torque zero. As a result, there is demonstrated an effect that the output torque can be raised. On top of that, because only the modes I and III are utilized, it is only necessary to concurrently open or close the opening/closing devices of all the phases; therefore, there is demonstrated an effect that the configuration and the like of wiring leads for providing commands from the opening/closing command means to the opening/closing devices can be simplified.

Moreover, because as the rotation information, only the rotation speed of an AC rotating machine is utilized, there is demonstrated an effect that while simplifying the configurations of the opening/closing command means and the switch, the output torque can be raised.

In Embodiment 5, described heretofore, the switch control means 6 creates mode commands, based on the rotation speed detected by the rotation detection means 7; however, it may be allowed that the rotation detection means 7 does not detect the rotation speed but estimates or detects the induction voltage of the AC rotating machine 2; the value obtained by multiplying the induction voltage by a gain may be dealt as the rotation speed. With regard to calculation of the induction voltage, it is only necessary to utilize a publicly known method such as a method utilizing of a current difference or a voltage. Because the induction voltage and the rotation speed are approximately in proportion to each other, an effect the same as the foregoing effect can be obtained.

Embodiment 6

In the foregoing embodiment 1, the switch control means 6 creates the mode command, based on the two rotation information items, i.e., the rotation angle and the rotation speed. The present embodiment differs from Embodiment 1 in that the mode commands are created by utilizing only the rotation angle, as the rotation information; the other configurations in the present embodiment are the same as those in Embodiment 1.

Figure 17A:
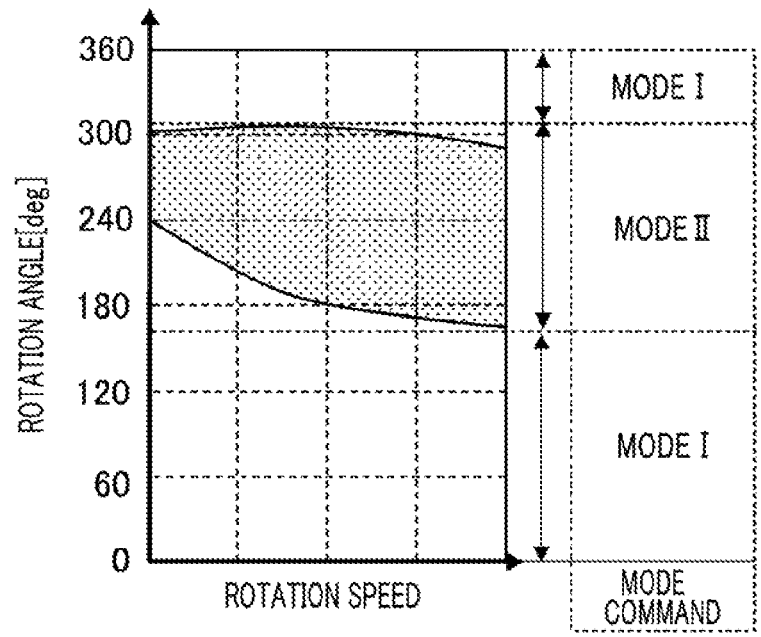
FIG. 17A is a graph representing a torque region map indicating the relationship between the rotation angle and the usage mode according to Embodiment 6 of the present invention.
Figure 17B:
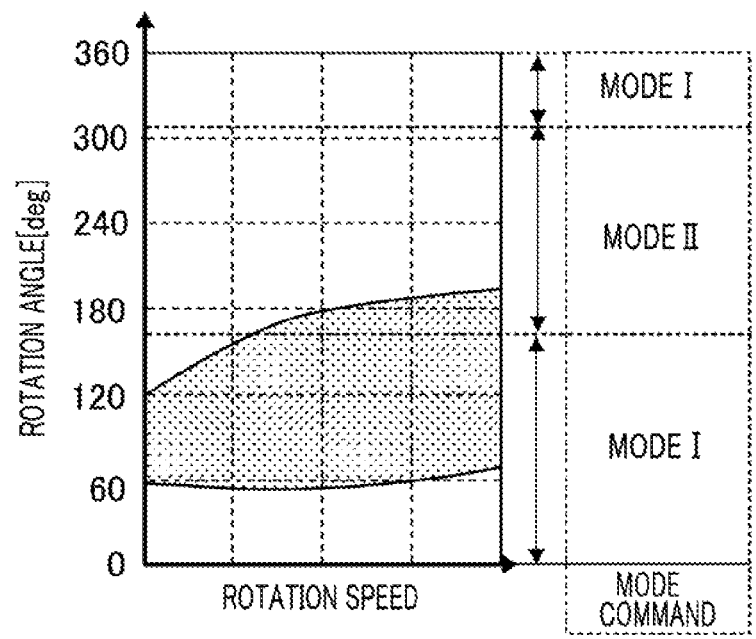
FIG. 17B is a graph representing a torque region map indicating the relationship between the rotation angle and the usage mode according to Embodiment 6 of the present invention.

In Embodiment 1, based on the rotation speed and the rotation angle, the region determination means 62 determines whether the rotation operating points are within the braking torque region in the torque region map for the mode I or within the power-running region; however, in the present embodiment, as represented at the right end of FIG. 17A and FIG. 17B, the mode command is selected based on only the rotation angle. In FIG. 17A and FIG. 17B, the angle regions are set in such a way that when the rotation angle is within the region that makes contact with and includes the dotted braking torque region, the mode II or the mode III is commanded.

At a time of a short-to-ground failure including a short-circuit failure in the lower-side switching device, the map selection means 61 selects FIG. 17A; the region determination means creates mode commands in such a way that in the case where the rotation angle is within the region that makes contact with and includes the dotted braking torque region, the mode II is commanded and in such a way that in the case where the rotation angle is within a region other than that region, the mode I is commanded.

At a time of a short-to-power failure including a short-circuit failure in the upper-side switching device, the map selection means 61 selects FIG. 17B; the region determination means creates mode commands in such a way that in the case where the rotation angle is within the region that makes contact with and includes the dotted braking torque region, the mode III is commanded and in such a way that in the case where the rotation angle is within a region other than that region, the mode I is commanded.

As a result of the foregoing configuration, Embodiment 6 differs from Embodiment 1 only in the difference between the dotted region in FIG. 17A and FIG. 17B and the region flanked with dotted lines that make contact with the dotted region; therefore, an effect the same as that of Embodiment 1 can be demonstrated.

Embodiment 7

In each of Embodiments 2 and 3, the switch 5 is provided with devices, for each of the phases, that can cut off bidirectional electric currents; however, in the present embodiment, the switch 5 is provided with devices, for only two out of three phases, that can cut off bidirectional electric currents. Embodiment 7 differs from each of Embodiments 2 and 3 in that the switch control means 6 does not utilizes the mode II but switches the mode I and the mode III; the other configurations in Embodiment 7 are the same as those in Embodiment 1.

Figure 18A:
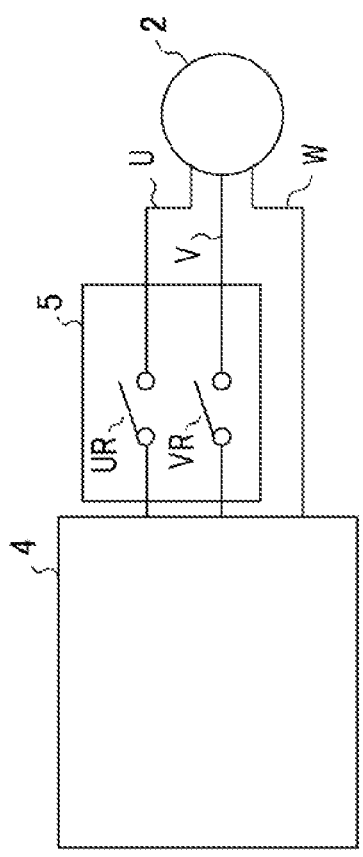
FIG. 18A is a views illustrating the configuration of a switch according to Embodiment 7 of the present invention.
Figure 18B:
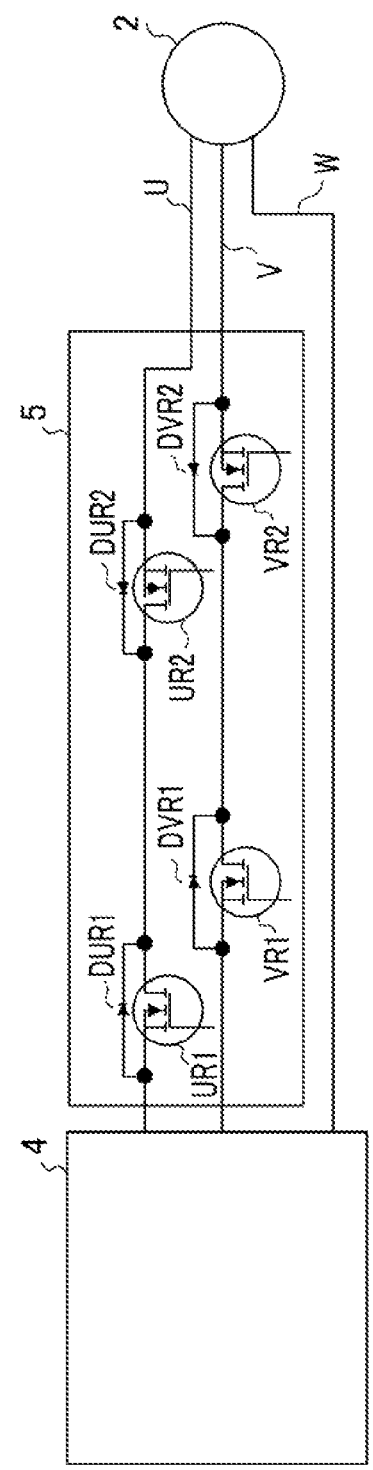
FIG. 18B is a views illustrating a variant example of configuration of the switch according to Embodiment 7 of the present invention.

The switch 5 is provided, only for two phases, with mechanical devices as illustrated in FIG. 18A that each can cut off bidirectional electric currents or with electric devices as illustrated in FIG. 18B, with which duplication is made in such a way that the directions of the two diodes in the same phase face each other. Although the devices are provided only for the two phases, electric currents of the three phases can be cut off when all the devices are opened.

In the switch control means 6, as is the case with each of Embodiments 2 and 3, the map selection means 61 selects the torque region map for the mode I and it is determined whether or not the rotation condition is within the dotted braking torque region; in the case where the rotation condition is within the dotted braking torque region, the mode command is created in such a way that the mode III is realized.

As a result, although the switch is simply configured in such a way as to be provided with opening/closing devices only for the two phases, braking torque can be eliminated and power-running torque can be outputted as much as possible; thus, the output torque can be raised.

Embodiment 8

In the foregoing embodiment 5, the switch control means 6 creates the mode commands by use of a rotation speed, as the rotation information; the switch 5 is simply configured in such a way that the opening/closes devices of all the phases are concurrently opened or closed; in the mode I, the switching device control means 3 raises the output torque through the abnormal-time current control means. However, in the present embodiment, the switching device control means 3 stops all the switching devices in the mode I. The other configurations are the same as those in Embodiment 5.

As a result, no power-running torque can be outputted; however, in the low-speed rotation region, the braking torque is produced in part of one rotation period, as represented in FIG. 7(b) of Patent Document 2. Because the braking torque appears as a ripple in the operation of the motor, there is demonstrated an effect that the user of the motor can recognize that the motor is out of order. Because of the low-speed rotation region, the braking torque is small; moreover, at a time of the high-speed rotation, because the mode moves to the mode III and the electric current can be cut off, the braking torque can be eliminated.

When a failure occurs in the electric-power converter, the AC rotating machine, or the electric connection path therebetween, the switch control means controls opening and closing of the switch in accordance with rotation information, and the switching device control means keeps the switching device opened; therefore, there can be demonstrated an effect that with the output torque kept approximately zero, the failure can be notified.

Embodiment 9

FIG. 19 illustrates Embodiment 9 of the present invention; there is illustrated an example in which any one of the control devices for an AC rotating machine disclosed in the foregoing embodiments is applied to an electric power steering device of an automobile. FIG. 19 is a schematic configuration diagram of an electric power steering device according to Embodiment 9 of the present invention.

Steering power exerted on a steering wheel 101 by an unillustrated driver passes through a steering shaft 103 and is transmitted to a rack through the intermediary of a rack-and-pinion gear 104, so that the directions of wheels 5 is turned. The AC rotating machine 2 is coupled with the steering shaft 103 through the intermediary of a motor-speed reduction gear 102. The torque (referred to also as auxiliary power, hereinafter) produced by the AC rotating machine 2 is transmitted to the steering shaft 103 through the intermediary of the motor-speed reduction gear 102, so that steering power, exerted by the driver when steering is performed, is reduced.

A torque detection means 106 detects, as the output torque, torque obtained by mixing torque produced by the AC rotating machine 2 with steering torque that is exerted on the steering shaft 103 due to steering of the steering wheel 101 by the driver. In accordance with the output torque detected by the torque detection means 106, the control device 1 determines the direction and the magnitude of the auxiliary power to be provided by the AC rotating machine 2 and controls the electric current flowing in the AC rotating machine 2 so that the auxiliary power is produced.

As the control device 1, any one of the control devices described in the foregoing embodiments is utilized. There is provided a current command creation means 107 that calculates a current command, based on the output torque detected by the torque detection means 106.

When in the case of an electric power steering device, control is stopped at a time when a failure occurs while traveling, the driver's feeling of discomfort is large; however, longest-possible continuation of the control can reduce the feeling of discomfort. In the case where appropriate control is continued for a longest-possible time even when some sort of failure exists, it is desirable to locate the failure point.

In the electric power steering device according to Embodiment 9, when a failure occurs in the electric-power converter, the AC rotating machine, or the electric connection path therebetween, the switch control means, simply configured, controls opening and closing of the switch in accordance with rotation information; therefore, braking torque can be eliminated and hence the output torque can be raised; thus, the driver's feeling of discomfort can be reduced.

In the foregoing embodiments, the switch is disposed at a position that is closer to the electric-power converter than to the motor; however, the switch may be disposed inside the motor, for example, at a position in the vicinity of the neutral point of the windings; because even in that case, the electric connection path is equivalent, an effect the same as the foregoing one can be obtained.

In the scope of the present invention, the embodiments thereof can freely be combined with one another and can appropriately be modified or omitted.

The invention claimed is:

1. A control device for an AC rotating machine, the control device comprising:
   an electric-power converter comprising two or more switching devices connected with the AC rotating machine, and configured to apply a voltage to the AC rotating machine;
   a switch configured to open and close an electric connection path between the AC rotating machine and the electric-power converter;
   a switching device controller configured to control the two or more switching devices to open and close; and
   a switch controller configured to, in response to a failure occurring in any one or any combination of the electric-power converter, the AC rotating machine, and the electric connection path between the electric-power converter and the AC rotating machine:
      control the switch to open and close based on rotation information of the AC rotating machine;
      control to open a first switching device included in the switch, the first switching device being of a same phase as that of a switching device in which the failure occurs among the two or more switching devices of the electric-power converter; and
      control to close other switching devices included in the switch, the other switching devices being of phases different from the phase of the first switching device.

2. The control device according to claim 1, wherein the switch controller is further configured to, in response to the failure occurring in any one or any combination of the electric-power converter, the AC rotating machine, and the electric connection path between the electric-power converter and the AC rotating machine, control the switch to open and close to control the voltage applied to the AC rotating machine.

3. The control device according to claim 1, wherein the rotation information is a rotation angle of the AC rotating machine.

4. The control device according to claim 1, wherein the rotation information is a rotation speed of the AC rotating machine.

5. The control device according to claim 1, wherein the rotation information is an induction voltage of the AC rotating machine.

6. The control device according to claim 1, wherein the switch controller is further configured to, in response to the failure occurring in any one or any combination of the electric-power converter, the AC rotating machine, and the electric connection path between the electric-power converter and the AC rotating machine, control to close all of switching devices included in the switch, the switching devices being of same phases as those of the two or more switching devices of the electric-power converter.

7. The control device according to claim 1, wherein the switch controller is further configured to, in response to the failure occurring in any one or any combination of the electric-power converter, the AC rotating machine, and the electric connection path between the electric-power converter and the AC rotating machine, control to open all of switching devices included in the switch, the switching devices being of same phases as those of the two or more switching devices of the electric-power converter.

8. The control device according to claim 1, wherein the switch controller is further configured to, in response to the failure occurring in any one or any combination of the electric-power converter, the AC rotating machine, and the electric connection path between the electric-power converter and the AC rotating machine, control to open the first switching device included in the switch, the first switching device being of the same phase as that of the switching device in which the failure occurs among the two or more switching devices of the electric-power converter, in response to the rotation information being in a region in which power running cannot be performed under a condition that all of switching devices included in the switch are closed.

9. The control device according to claim 1, wherein the switch is further configured to cut off bidirectional electric currents.

10. The control device according to claim 1, wherein the switch is further configured to cut off a unidirectional electric current.

11. An electric power steering device, wherein the control device according to claim 1 is utilized.

12. The control device according to claim 2, wherein the rotation information is a rotation angle of the AC rotating machine.

13. The control device according to claim 2, wherein the rotation information is a rotation speed of the AC rotating machine.

14. The control device according to claim 2, wherein the rotation information is an induction voltage of the AC rotating machine.

15. The control device according to claim 2, wherein the switch controller is further configured to, in response to the failure occurring in any one or any combination of the electric-power converter, the AC rotating machine, and the electric connection path between the electric-power converter and the AC rotating machine, control to close all of switching devices included in the switch, the switching devices being of same phases as those of the two or more switching devices of the electric-power converter.

16. The control device according to claim 2, wherein the switch controller is further configured to, in response to the failure occurring in any one or any combination of the electric-power converter, the AC rotating machine, and the electric connection path between the electric-power converter and the AC rotating machine, control to open all of switching devices included in the switch, the switching devices being of same phases as those of the two or more switching devices of the electric-power converter.

17. The control device according to claim 6, wherein the switch controller is further configured to, in response to the failure occurring in any one or any combination of the electric-power converter, the AC rotating machine, and the electric connection path between the electric-power converter and the AC rotating machine, control to open the first switching device included in the switch, the first switching device being of the same phase as that of the switching device in which the failure occurs among the two or more switching devices of the electric-power converter, in response to the rotation information being in a region in which power running cannot be performed under a condition that all of the switching devices included in the switch are closed.

18. The control device according to claim 6, wherein the switch controller is further configured to, in response to the failure occurring in any one or any combination of the electric-power converter, the AC rotating machine, and the electric connection path between the electric-power converter and the AC rotating machine, control to open all of the switching devices included in the switch, the switching devices being of the same phases as those of the two or more switching devices of the electric-power converter, in response to the rotation information being in a region in which power running cannot be performed under a condition that all of the switching devices included in the switch are closed.

19. The control device according to claim 7, wherein the switch controller is further configured to, in response to the failure occurring in any one or any combination of the electric-power converter, the AC rotating machine, and the electric connection path between the electric-power converter and the AC rotating machine, control to open all of the switching devices included in the switch, the switching devices being of the same phases as those of the two or more switching devices of the electric-power converter, in response to the rotation information being in a region in which power running cannot be performed under a condition that all of the switching devices included in the switch are closed.

* * * * *